Patented Sept. 18, 1951

2,568,023

UNITED STATES PATENT OFFICE 2,568,023

FREE FILTERING ASBESTOS AND METHOD OF PRODUCING SAME

Walter M. Perry, Darien, Conn., assignor to Johns-Manville Corporation, New York, N. Y., a corporation of New York No Drawing. Application August 24, 1946, Serial No. 692,915

8 Claims. (Cl. 106—99)

This invention relates to an improved free filtering form of chrysotile asbestos fibers and to a method of treating such fibers to increase their freeness or filterability.

Crude chrysotile asbestos contains coarse bundles or aggregates of fibrous crystals. An initial step in the preparation of asbestos for commercial use consists in the treatment of such crude fibers by willowing or mechanical impact to open or shatter and fray the fiber bundles or aggregates to produce a greater number of finer fibrous chrysotile filaments. This fiberizing treatment is necessary to improve the felting characteristics of the fibers and to thereby improve the quality of the sheets which can be produced by wet or dry process felting operations.

The present invention is concerned with a method of treating such opened and fiberized fibers to better adapt the fibers for use in the manufacture of water laid felted fiber sheets such as paper or mill board or asbestos-cement sheets.

One of the principal difficulties which are encountered in the formation of chrysotile asbestos fiber sheets is the comparative slowness with which water separates from the fibers by filtration as the sheet is being formed. This slow filtering rate has a serious retarding action on the speed of operation of the sheet forming process and apparatus.

An object of the present invention is to provide an improved form of chrysotile asbestos fibers having free filtering characteristics.

A further object is to provide a method of treating chrysotile asbestos fibers to improve their freeness or filtering characteristics to better adapt them for use in the manufacture of felted fiber sheets and blocks.

The freeness or filtering characteristics of chrysotile asbestos fibers can be so improved by the present process as to make it possible to employ lower grades of shorter fibers to produce sheets by conventional sheet forming methods.

Methods have heretofore been proposed for treating asbestos fibers with chemical flocculating agents, with the object of increasing their freeness. Such methods in general, however, adversely affect the strength and felting characteristics of the fibers. For example, any treatment of the fibers which tends to increase their tendency to form agglomerates or flocks in water suspension is likely to adversely affect the wet process sheet forming step by reducing the possibility of forming a uniformly felted sheet of uniform fine texture and of suitable strength.

Another object of the invention is to provide an improved method of enhancing the free filtering characteristics of asbestos fibers without substantial adverse effect on the tensile strength and felting characteristics of the fibers.

With the aforementioned objects and features in view, the invention consists in the improved method of increasing the freeness of asbestos fibers and of manufacturing water-laid asbestos fiber sheets which is hereinafter described and more particularly defined by the accompanying claims.

The shorter grades of chrysotile asbestos fibers which give the most difficulty in paper and sheet forming operations because of slow filtering characteristics, develop a slimy surface coating when wet. It has been found that such fibers of slimy and slow filtering characteristics can be converted by application of a light coating of hydrated incompletely cured hydraulic cement, into fibers of comparatively much improved filtering and wet sheet forming characteristics which have lost their tendency to become slimy when wet. By limiting the amount of cement coating, and the degree of coating cure, it is possible to develop a high proportional increase in the filtering rate without substantial reduction of tensile strength and felting characteristics of the fibers.

The preferred process includes the primary step of dry mixing clean, well-opened chrysotile asbestos fibers with about 5–25% by weight of the fibers of finely divided (finer than 200 mesh) hydraulic cement under conditions adapted to distribute the cement particles as a thin discontinuous coating over the surfaces of the individual fibers. The dry cement coated fibers are moistened with water and the moist mixture is agitated and then allowed to cure incompletely in air for a period which may range from say 30 minutes to several days, whereby to develop hydration and partial hardening set of the cement coating. The thus coated fibers are preferably opened and separated, as by passing through a fan or willow, to break down any lumps or clots of fiber.

For purposes of illustration the invention will be hereinafter more particularly described as applied to the manufacture of asbestos-cement sheets from mixtures of short shingle or paper grade chrysotile asbestos and Portland cement. It will be understood, however, that the invention has general application to the manufacture of asbestos fiber sheets or shapes, including paper, and to the treatment of asbestos fibers in general, and particularly the shorter grades, to enhance their filtering characteristics for use in the manufacture of shaped products. The process has particular utility for treating grades of chrysotile asbestos fibers ranging as to size classification over groups 3-7, including floats, in accordance with the Standard Quebec Screen Classification Test.

As applied, for example, to the manufacture of water-laid asbestos-cement sheets, there may be employed group 6 fibers all finer than 4 mesh screen and classifying approximately 10 ounces out of a 16 ounce sample retained on a 10 mesh screen, and the balance through a 10 mesh screen. Such fibers may be coated individually by dry mixing a batch of the fibers with finely divided Portland cement in the proportions of 10 parts of fiber to 1 part of cement. After the dry mixing opeartion, water is sprayed over the fibers in the proportions of about 1 part of water by weight for each part of cement, and the mixture is agitated in a paddle type mixer to effect uniform distribution of the water. The slightly damp mixture of cement coated fibers which is thus produced is allowed to stand in air at atmospheric temperature for a period varying from a few minutes to several days to develop a partial hydration and set of the cement coating. The thus coated fibers may then be passed through a fan or willow to eliminate any lumps or clots of fibers and to effect the separation of individual fibers.

As a result of the coating treatment described above, the fibers are coarsened to some extent. Thus, the Quebec Screen Test for willowed uncoated fibers showed 10 ounces of a 16 ounce sample retained on a 10 mesh screen, whereas 10½ ounces of a like sample of the coated fibers were retained on a 10 mesh screen. The filtering rate of the fibers was greatly increased by the treatment, as evidenced by a test measuring the pressure required to filter water through a bed of the fibers of predetermined depth at a predetermined rate, which in this particular case was 66.6 gallons per square foot per hour. It was found that the same amount of water could be filtered through a bed of the coated fibers under 5 lbs. pressure in a 5 minute period as could be filtered through the same depth of uncoated fibers in a period of the same length under a filtering pressure of 49 lbs. The tensile strength of the individual fibers is not adversely affected by the present light precoating treatment, despite the fact that the treatment greatly enhances the filtering characteristics. However, the felting characteristics of the fibers and the strength of sheets made therefrom may be adversely affected to some extent by the coating treatment, and for this reason there is an optimum limit proportion of cement which should be applied as a coating to develop satisfactory improvement in the filtering characteristics of the fibers without serious adverse effect on the felting characteristics. An optimum increase in filterability of as much as 1000% can be effected without serious adverse effect on the felting characteristics of the fibers or on the tensile strength of sheets made from the fibers, by coating the fibers with not to exceed 25% of their weight of hydrated partially cured cement, and by using the thus coated fibers in a water laid felt prior to the time when such cement coating has been completely set or hardened.

Satisfactory sheet forming characteristics are also obtained by mixing fibers coated as herein described with uncoated chrysotile fibers in proportions designed to suitably increase the filtering characteristics of the resulting sheet while minimizing any adverse effect on the strength of the resulting water laid felt.

Fibers thus lightly coated with hydrated incompletely cured hydraulic cement were incorporated with finely divided Portland cement in a conventional aqueous slurry furnish contaninng cement and coated asbestos fibers in approximately the ratio of 3:1 by weight. During the sheet forming operation the fiber-cement slurry was allowed to flow onto the filtering bed of a sheet forming press such as conventionally used in the manufacture of compressed asbestos-cement sheets. The ram of the hydraulic press was then brought down on the composition, expressing therefrom a major proportion of the water by filtration through the felted cement coated fibers and bonding cement, under relatively low initially applied pressure. After removal of the major proportion of the water, the felted sheet was subjected to high pressures of the order of 2000 lbs. per square inch to densify the product, and the product was then cured to develop a hardening set. Comparison of the initial dewatering rate of a sheet so made by employing asbestos fibers coated in accordance with the invention, with the dewatering rate of a corresponding sheet made with the same relative proportion of uncoated fibers, under conditions otherwise the same, demonstrated an increase in the initial dewatering rate and filterability of the sheet formed with lightly coated fibers.

By the method of the present invention the wet felting and sheet forming characteristics of chrysotile asbestos fibers are improved without adverse effect on the heat and flame resistance of the resulting product. The invention provides an economical method of increasing the bulk and filtering rate of asbestos fibers, and of water laid asbestos fiber felts. Because of the greater freeness imparted to the fibers, it is possible to produce sheets of greater thickness. Moreover, with fibers treated in accordance with the present invention the sheet forming operation is greatly improved, enabling the production of sheets at an appreciably higher rate.

By adding mineral pigments to the cement coating, permanent colors may be imparted to the coated fibers. The density of the coating may be varied by incorporating therein small proportions of finely divided silica. When silica is introduced into the fiber coating, the speed of the coating cure is advantageously accelerated by carrying out the partial cure in an atmosphere of saturated steam at a temperature equivalent to steam pressures of the order of 100-150 lbs. gauge.

The invention which has been thus described by detailed example is not limited as to such details and it is to be understood that variations, changes and modifications are contemplated within the scope of the invention as defined by the following claims.

What I claim is:

1. A free filtering loose mass of flexible chrysotile asbestos fibers which are individually provided with 5% to 25% by weight of a discontinuous, hydrated and incompletely hardened thin coating of hydraulic cement composition.

2. In conditioning a loose mass of chrysotile asbestos fibers to improve the freeness thereof the steps comprising, depositing on the surfaces of the individual fibers a discontinuous thin coating of not to exceed 25% by weight of finely divided hydraulic cement, hydrating and incompletely hardening the coatings, and separating the coated fibers.

3. In conditioning chrysotile asbestos fibers to improve the freeness thereof the steps comprising, dry mixing a mass of the fibers with 5% to 25% of their weight of finely divided hydraulic cement to distribute the cement particles over the surfaces of the fibers, moistening the mixture with water and agitating the same, and hydrating and incompletely curing the fiber coating.

4. A method of treating asbestos fibers to improve the filtering characteristics thereof which comprises, dry mixing about ten parts by weight of said fibers with about ½-1 part by weight of finely divided Portland cement whereby to distribute the cement particles over the fiber surfaces, moistening the cement coated fibers with about ½-1 part of water, hydrating and partially hardening the cement coating, and willowing the coated fibers to open the fiber mass.

5. In manufacturing a free filtering asbestos fiber adapted for forming a water-laid felt product the steps comprising, coating individual fibers with a light discontinuous flexible coat of 5% to 25% by weight of hydrated partially hardened hydraulic cement, and willowing a batch of thus coated fibers.

6. A free filtering loose mass of flexible asbestos fibers which are individually provided with not to exceed 25% by weight of a discontinuous hydrated and incompletely hardened thin coating of Portland cement.

7. In preconditioning fibers for manufacturing a water laid fibro-cementitious sheet the steps comprising, individually coating the fibers in a mass of flexible fibers with thin discontinuous flexible coats of hydrated partially hardened hydraulic cement, the coat for an individual fiber representing not to exceed 25% by weight of the fiber, and separating said coated fibers by a willowing treatment.

8. In conditioning a loose mass of chrysotile asbestos fibers to improve the freeness thereof the steps comprising, depositing on the surfaces of the individual fibers discontinuous thin coatings of moist finely divided hydraulic cement, the cement making up approximately 5%–25% of the dry weight of the fibers, hydrating and partially setting the cement coatings, and willowing the thus coated fibers.

WALTER M. PERRY.

REFERENCES CITED

The following references are of record in the file of this patent:

UNITED STATES PATENTS

| Number | Name | Date |
|---|---|---|
| 769,078 | Hatschek | Aug. 30, 1904 |
| 837,717 | Perry | Dec. 4, 1906 |
| 1,256,296 | Charlton | Feb. 12, 1918 |
| 1,408,401 | Richards | Feb. 28, 1922 |
| 1,581,619 | Sulzberger | Apr. 20, 1926 |
| 1,762,267 | Freret | June 10, 1930 |
| 1,907,616 | Tucker | May 9, 1933 |
| 2,267,913 | Halstead | Dec. 30, 1941 |
| 2,309,206 | Newman | Jan. 26, 1943 |
| 2,394,040 | Callinan | Feb. 5, 1946 |

FOREIGN PATENTS

| Number | Country | Date |
|---|---|---|
| 455,343 | Great Britain | Oct. 19, 1936 |